(12) United States Patent
Bunte et al.

(10) Patent No.: US 10,873,536 B2
(45) Date of Patent: Dec. 22, 2020

(54) DISTRIBUTION NODE, AUTOMATION NETWORK, AND METHOD FOR TRANSMITTING REAL-TIME-RELEVANT AND NON-REAL-TIME-RELEVANT DATA PACKETS

(71) Applicant: BECKHOFF AUTOMATION GMBH, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 222 days.

(21) Appl. No.: 15/428,926

(22) Filed: Feb. 9, 2017

(65) Prior Publication Data

US 2017/0171096 A1 Jun. 15, 2017

Related U.S. Application Data

(63) Continuation of application No. PCT/EP2015/068757, filed on Aug. 14, 2015.

(30) Foreign Application Priority Data

Aug. 22, 2014 (DE) .......... 10 2014 112 082

(51) Int. Cl.
*H04L 12/875* (2013.01)
*H04L 12/863* (2013.01)
(Continued)

(52) U.S. Cl.
CPC ........ *H04L 47/56* (2013.01); *H04L 12/40006* (2013.01); *H04L 12/4625* (2013.01);
(Continued)

(58) Field of Classification Search
CPC ..... H04L 47/56; H04L 47/745; H04L 47/801; H04L 67/125
See application file for complete search history.

(56) References Cited

U.S. PATENT DOCUMENTS

| 8,179,923 B2 | 5/2012 | Krause | |
|---|---|---|---|
| 2005/0058149 A1* | 3/2005 | Howe | H04L 47/10 370/428 |

(Continued)

FOREIGN PATENT DOCUMENTS

| CN | 101115012 A | 1/2008 |
|---|---|---|
| DE | 10058524 A1 | 6/2002 |

(Continued)

OTHER PUBLICATIONS

"Fault-Tolerant Hard-Real-Time Communication of Dynamically Reconfigurable, Distributed Embedded Systems," Proceedings of Eighth IEEE International Symposium on Object-Oriented Real-Time Distributed Computing (9 pages).

(Continued)

*Primary Examiner* — Kodzovi Acolatse
*Assistant Examiner* — Farhad Ali
(74) *Attorney, Agent, or Firm* — Dorsey & Whitney LLP (57) ABSTRACT

A distribution node for an automation network comprises at least two input/output interfaces for transmitting and receiving real-time-relevant and non-real-time-relevant data packets, and a switching device connected to the input/output interfaces. The switching device forwards data packets received via an input/output interface via a further input/output interface using a switching table, where the switching (Continued)

table contains at least a data packet identifier and a transmission time in a data transfer cycle for each real-time-relevant data packet. Inter alia, the switching device can detect a data packet identifier on reception of a real-time-relevant data packet, and output the real-time-relevant data packet at the transmission time allocated to the detected data packet identifier in the switching table via an input/output interface as a transmission interface.

18 Claims, 5 Drawing Sheets

(51) Int. Cl.

| | | |
|---|---|---|
| *H04L 12/911* | (2013.01) | |
| *H04L 12/46* | (2006.01) | |
| *H04L 12/40* | (2006.01) | |
| *H04L 12/931* | (2013.01) | |
| *H04L 12/741* | (2013.01) | |
| *H04L 12/927* | (2013.01) | |
| *H04L 29/08* | (2006.01) | |

(52) U.S. Cl.
CPC .......... *H04L 45/745* (2013.01); *H04L 47/625* (2013.01); *H04L 47/628* (2013.01); *H04L 47/801* (2013.01); *H04L 47/822* (2013.01); *H04L 47/826* (2013.01); *H04L 49/206* (2013.01); *H04L 49/351* (2013.01); *H04L 67/125* (2013.01); *H04L 2012/4026* (2013.01)

(56) References Cited

U.S. PATENT DOCUMENTS

| | | | | |
|---|---|---|---|---|
| 2006/0109866 | A1* | 5/2006 | Janssen | ............ H04L 12/40156 370/493 |
| 2010/0232430 | A1* | 9/2010 | De | ...................... H04L 12/6418 370/389 |

FOREIGN PATENT DOCUMENTS

| | | |
|---|---|---|
| DE | 10249851 A1 | 10/2002 |
| EP | 1512254 B1 | 10/2005 |
| EP | 2515492 A1 | 10/2012 |
| KR | 10200700055424 A | 1/2007 |
| KR | 1020080055201 A | 6/2008 |
| WO | 2016026783 A1 | 2/2016 |

OTHER PUBLICATIONS

Translation of International Search Report for International Patent Application No. PCT/EP2015/068757, dated Nov. 23, 2015 ( 3 pages).
First Office Action for Chinese Patent Appln No. 201580045284.9, dated Jan. 3, 2019 (9 pages).

* cited by examiner

| Sendezeitpunkt | Telegrammkennung | Empfangs-Schnittstelle | Sende-Schnittstelle |
|---|---|---|---|
| T1 | CYC1 | 103 | 101 |
| T2 | CYC2 | 102 | 101 |
| T3 | CYC3 | 104 | 101 |
| T4 | CYC4 | 104 | 101 |
|    | ACYC1 | 103 | 101 |
|    | ACYC2 | 102 | 101 |
|    | ACYC3 | 104 | 101 |

DISTRIBUTION NODE, AUTOMATION NETWORK, AND METHOD FOR TRANSMITTING REAL-TIME-RELEVANT AND NON-REAL-TIME-RELEVANT DATA PACKETS

CROSS-REFERENCE TO RELATED APPLICATION

This application is a continuation of PCT Application PCT/EP2015/068757, filed Aug. 14, 2015, which claims priority to German Patent Application DE 10 2014 112 082.5, filed Aug. 22, 2014, each of which is incorporated by reference herein, in the entirety and for all purposes.

FIELD

The invention relates to a distribution node, an automation network with a distribution node, and a method for transmitting real-time-relevant and non-real-time-relevant data packets in an automation network.

BACKGROUND

Local communication networks, referred to as "local area networks" (LANs), are limited to a geographical area and consist of one or more servers and workstations, referred to as nodes, which are interconnected via a communication line, e.g. a coaxial, optical fiber or twisted-pair cable. LANs are operated with a network operating system and a network protocol network.

The currently most widespread standard for a LAN network protocol is the Ethernet, with which data packets, also referred to below as Ethernet messages, can be transmitted with data up to 1500 bytes in length at a speed in the gigabit range. The Ethernet protocol was first used in office communication networks. Due to the advantages of the Ethernet concept, resulting from the use of standard hardware and software components and the possibility of achieving high data transmission rates even with simple networking technology, Ethernet network communication is now used in industrial production also, primarily for data exchange and for the performance of control tasks.

With the use of LANs in automation technology, the real-time capability of the network protocol, in particular, must be guaranteed. In the control of machinery, it is necessary for a cyclic processing of the control task to proceed without temporal fluctuations, i.e. with only slight deviations from the desired cycle time in the range of a few microseconds, wherein a response is given to the control request with a predictable response time.

In order to limit the transit time of the data packets from the transmitting node to the receiving node and thus be able to achieve a real-time capability in LANs with many nodes, also referred to below as participants, LANs of this type are often structured hierarchically using distribution nodes, referred to as switches. The distribution node has a plurality of input/output interfaces via which a plurality of nodes or node strings are incorporated in parallel into the network. The distribution node examines each data packet received on an input/output interface for the address of the addressed participant and then forwards the data packet to the addressed participant via the allocated input/output interface to which the participant is connected.

The distribution nodes normally operate according to the FIFO principle, in which the data packets that were first received are also the first to be retransmitted. However, this prevents a reliable real-time processing of the data packets. More recent distribution nodes therefore often support "VLAN tagging," with which individual data packets can be prioritized for transmission in order to thus guarantee a real-time capability.

Furthermore, distribution nodes are also known which forward data packets at fixed, predefined times on the basis of protocol-specific identifiers in order to thus enable a real-time processing. A switching device with a switching table, referred to as a routing list, which normally contains a data packet identifier, reception and transmission interfaces and a transmission time for each real-time-relevant data packet is then provided in the distribution node. Along with the real-time-relevant data packets which cyclically transmit input/output data of the nodes, further non-real-time-relevant data packets which usually transmit parameter data or status data of the nodes acyclically are also normally received and transmitted in the network. No transmission time is then predefined in the routing list of the distribution node for non-real-time-relevant data packets of this type.

Along with the use of distribution nodes as switches in order to incorporate a plurality of nodes or node strings in parallel into the network, a distribution node can also be used as a synchronization gateway for a master node. The distribution node then has only two input/output interfaces to connect the master node to the network. The interposed distribution node then serves to synchronize all data packets of the master node with the network. Since the forwarding of the data packets from one input/output interface to the other input/output interface is permanently predefined in the distribution node, the routing list must contain a transmission time only for each real-time-relevant data packet.

So that the transmission process for non-real-time-relevant data packets does not delay the transmission process for real-time-relevant data packets, a data transfer cycle for the data packets in the distribution node is normally subdivided into three time sections. A procedure of this type is described in U.S. Pat. No. 8,179,923B2. In a first time section, referred to as the cyclic time section, only real-time-relevant data packets may be received and forwarded. In the subsequent second time section, referred to as the acyclic time section, non-real-time-relevant data packets are then forwarded. In the final, third time section, referred to as the transitional time section, all data packets may continue to be received, but may no longer be transmitted.

The transitional time section, which corresponds at least to the maximum transmission duration for a non-real-time-relevant data packet, prevents the occurrence, in the subsequent next cyclic time section, of a delayed forwarding of real-time-relevant data packets due to an ongoing process of transmitting a non-real-time-relevant data packet. The non-real-time-relevant data packets received in the transitional time section are temporarily stored in the distribution node in order to be forwarded in the next acyclic time section.

Since each node can forward non-real-time-relevant data packets outside the cyclic time section, particularly in the transitional time section also, in an uncontrolled manner, overload situations of the non-real-time-relevant data packets easily occur in the distribution node. Overload situations of this type occur, in particular, if the acyclic time section in the data transfer cycle is substantially reduced compared with the cyclic time section. Due to the transit times within the network and in order to achieve the shortest possible hold-up durations in the data transmission, the real-time-relevant data packets are often not transmitted immediately after one another in the cyclic time section, but with interspersed time gaps, as a result of which the cyclic time section is lengthened. In such a case, the risk then exists that the reception buffer for the non-real-time-relevant data packets in the distribution node overflows if too many non-real-time-relevant data packets are received in the transitional time section and in the acyclic time section.

SUMMARY

The present invention provides a distribution node, an automation network and a data transmission method for the simple and reliable transmission of real-time-relevant and non-real-time-relevant data packets.

According to one aspect, a distribution node for an automation network comprises at least two input/output interfaces for transmitting and receiving real-time-relevant and non-real-time-relevant data packets, and a switching device connected to the input/output interfaces. The switching device forwards data packets received via an input/output interface via a further input/output interface using a switching table, wherein the switching table contains at least a data packet identifier and a transmission time in a data transfer cycle for each real-time-relevant data packet. The switching device detects a data packet identifier on reception of a real-time-relevant data packet. The switching device outputs the real-time-relevant data packet at the transmission time allocated to the detected data packet identifier in the switching table via an input/output interface as a transmission interface. The switching device, on reception of a non-real-time-relevant data packet, detects the length of the non-real-time-relevant data packet in order to determine the transmission duration resulting therefrom for the non-real-time-relevant data packet. The switching device, at least if an input/output interface is provided as a transmission interface for a non-real-time-relevant data packet and is in the transmission-free state, detects the transmission pause duration remaining until the forwarding of the next real-time-relevant data packet for the respective input/output interface and to check whether a non-real-time-relevant data packet is present with a transmission duration which corresponds at most to the transmission pause duration for the input/output interface as the transmission interface in order to forward the non-real-time-relevant data packet via the input/output interface in the event of a positive check result.

According to another aspect, an automation network comprises a distribution node and at least one node. The distribution node comprises at least two input/output interfaces for transmitting and receiving real-time-relevant and non-real-time-relevant data packets, and a switching device connected to the input/output interfaces. The switching device forwards data packets received via an input/output interface via a further input/output interface using a switching table, wherein the switching table contains at least a data packet identifier and a transmission time in a data transfer cycle for each real-time-relevant data packet. The switching device detects a data packet identifier on reception of a real-time-relevant data packet. The switching device outputs the real-time-relevant data packet at the transmission time allocated to the detected data packet identifier in the switching table via an input/output interface as a transmission interface. The switching device, on reception of a non-real-time-relevant data packet, detects the length of the non-real-time-relevant data packet in order to determine the transmission duration resulting therefrom for the non-real-time-relevant data packet. The switching device, at least if an input/output interface is provided as a transmission interface for a non-real-time-relevant data packet and is in the transmission-free state, detects the transmission pause duration remaining until the forwarding of the next real-time-relevant data packet for the respective input/output interface and to check whether a non-real-time-relevant data packet is present with a transmission duration which corresponds at most to the transmission pause duration for the input/output interface as the transmission interface in order to forward the non-real-time-relevant data packet via the input/output interface in the event of a positive check result. Each input/output interface is connected to at least one node and wherein the data transfer of the real-time-relevant and the non-real-time-relevant data packets takes place with the individual data transfer cycle.

According to another aspect, a method for transmitting real-time-relevant and non-real-time-relevant data packets in an automation network with a plurality of nodes and a distribution node which has at least two input/output interfaces and a switching device connected to the two input/output interfaces is provided. Each input/output interface of the distribution node is connected to at least one node, and the distribution node forwards data packets received via an input/output interface via a further input/output interface using a switching table, wherein the switching table contains at least a data packet identifier and a transmission time in a data transfer cycle for each real-time-relevant data packet. The switching device detects a data packet identifier on reception of a real-time-relevant data packet. The switching device outputs the real-time-relevant data packet at the transmission time allocated to the detected data packet identifier in the switching table via an input/output interface as a transmission interface. The switching device of the distribution node, on reception of a non-real-time-relevant data packet, detects the length of the non-real-time-relevant data packet in order to determine the transmission duration resulting therefrom for the non-real-time-relevant data packet. The switching device of the distribution node, at least if an input/output interface is provided as a transmission interface for a non-real-time-relevant data packet and is in the transmission-free state, detects the transmission pause duration remaining until the forwarding of the next real-time-relevant data packet for the respective input/output interface and checks whether a non-real-time-relevant data packet is present with a transmission duration which corresponds at most to the transmission pause duration for this input/output interface as the transmission interface in order to forward the non-real-time-relevant data packet via the input/output interface in the event of a positive check result.

BRIEF DESCRIPTION OF THE DRAWINGS

The invention is explained in more detail below with reference to preferred exemplary embodiments, in which:

FIGS. 4A, 4B, 4C show a data packet forwarding in the distribution node shown in FIG. 2, wherein

DETAILED DESCRIPTION

In industrial automation, automation networks are used to connect devices disposed in a distributed manner at an actuator/sensor level to a control level. The automation networks, also referred to as fieldbus systems, have a serial bus to which all network participants, also referred to below as nodes, are connected. The fieldbus systems are normally operated as master-slave bus systems. The master participants in the fieldbus system are the control nodes which control the data traffic on the serial bus. Master nodes of this type are, for example, industrial computers which serve as process control computers in production lines. The master nodes have a bus access authorization and can output data onto the serial bus. The slave participants in the fieldbus system are formed by the machinery peripheral devices, such as, for example, I/O devices, valves, drives, sensors, measuring transducers. They do not normally have their own bus access authorization, i.e. they can only acknowledge received data and forward data via the bus on demand.

Fieldbus systems can be operated with different network protocols. The Ethernet standard has become established as a communication standard for networks. With the Ethernet concept, the data are encapsulated with a header section, also referred to below simply as the header, and an end section, referred to below as the trailer, for the transport from node to node. Ethernet data packets, also referred to below as Ethernet messages, have a data length of up to 1500 bytes and can be transmitted at speeds up to the gigabit range. However, as well as the Ethernet protocol, other protocols, in particular fieldbus protocols such as Profinet or EtherCAT, may also be used in fieldbus systems.

A specific network protocol can also be used in fieldbus systems as application software at the participant level and a different network protocol can be used at the bus level. In this case, in the data exchange via the fieldbus, the data packets that have been generated at the participant level and have been created with the one network protocol are encapsulated in the other network protocol at the bus level for the inter-node data traffic. Thus, if the Ethernet protocol is used as the higher-order network protocol for the data exchange between the nodes, the data packet generated with a fieldbus protocol such as Profinet or EtherCAT is packed by adding a header and a trailer in order to form an Ethernet message.

In industrial automation, control is implemented by means of a data exchange via fieldbus systems normally in such a way that the master node performs control processes cyclically in order to generate output data for slave nodes on the basis of input data in said slave nodes. On completion of a control process cycle, the master node then sends the output data in the form of data packets on the fieldbus, wherein the slave nodes remove the output data allocated to the respective node from the data packets and perform a local node process with these output data. The data determined from the local node process are then in turn sent back from the slave node to the master node and are then used by the master node as input data for the next control process cycle.

In order to be able to perform fast control processes in industrial automation using fieldbus systems, a short round-trip time of the data packets must be guaranteed so that a real-time performance of the control process is achieved. In fieldbus systems with many nodes, branches are used in order to shorten the transit time of the data packets from the transmitting node to the receiving node. The fieldbus system then has a distribution node, also referred to below as a switch, in the data transmission path, to which a plurality of independent data paths are connected.

Figure 1:
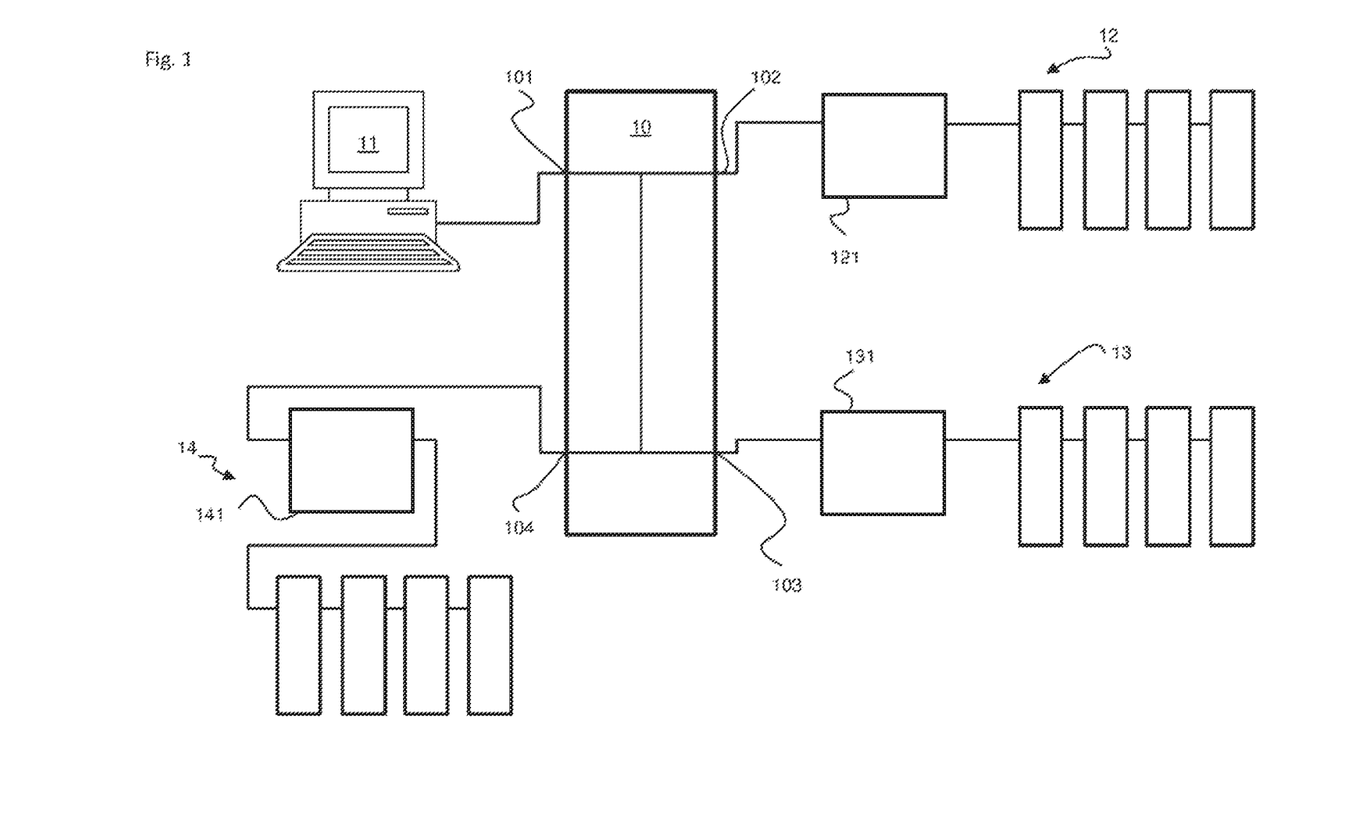
FIG. 1 shows an automation network according to the invention with a distribution node in a schematic representation.

FIG. 1 shows schematically a fieldbus system of this type with a distribution node 10 which has four input/output interfaces 101, 102, 103, 104. However, the possibility exists to provide more or fewer input/output interfaces instead of four input/output interfaces. Thus, if the distribution node is used, for example, as a synchronization gateway for a master node, it may have only two input/output interfaces. The requirements for the transmission accuracy of the master node can then be reduced with the interposition of a distribution node of this type between the master node and the network. The interposed distribution node synchronizes all data packets of the master node with the network.

In the design of the distribution node 10 shown in FIG. 1, a first input/output interface 101 is connected to a master node 11. A slave node string 12, 13, 14, which in each case has four slave nodes in the embodiment shown, is connected in each case to the further three input/output interfaces 102, 103, 104. More or fewer slave nodes can obviously also be interconnected in each slave node string.

In the design shown, the fieldbus system is operated with the Ethernet protocol, wherein, however, the individual slave nodes operate with the EtherCAT protocol. The slave nodes operated with the EtherCAT protocol are interconnected in each slave node string via a ring-shaped data path. An EtherCAT coupler 121, 131, 141 is connected in each case between the distribution nodes 10 and the slave node strings 12, 13, 14, said coupler transposing the Ethernet messages arriving from the distribution node 10 without a significant delay onto the ring structure of the downstream slave nodes in the slave node string 12, 13, 14 and feeding the Ethernet messages back onto the distribution node 10 after they have passed through the ring structure of the slave node string 12, 13, 14. This design with an interposed EtherCAT coupler 121, 131, 141 offers the advantage that a plurality of slave nodes form an Ethernet connection and the Ethernet messages can then be processed with a reduced hardware outlay as they pass through.

Figure 2:
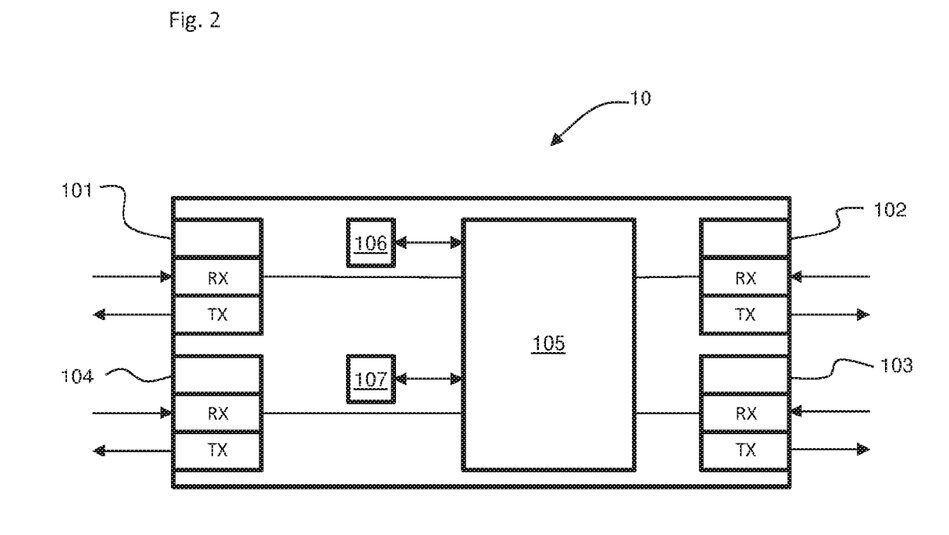
FIG. 2 shows a distribution node according to the invention in a schematic representation.

FIG. 2 shows schematically the structure of the distribution node 10. The four input/output interfaces 101, 102, 103, 104 are connected to a switching device 105. Each input/output interface 101, 102, 103, 104 has a receiving unit RX and a transmitting unit TX. The respective data transmission direction of the receiving unit RX and the transmitting unit TX is shown by arrows in FIG. 2. The switching device 105 controls the data traffic in the distribution node 10.

Along with the data packets between the master node and the slave node which serve to perform control tasks and of which the data traffic runs cyclically, further data packets are also exchanged in fieldbus systems in an acyclic data traffic. The acyclic data traffic is used for events in the fieldbus system which are not constantly repeated. Acyclic data packets are, for example, data packets with parameterization and configuration data and data with diagnostic messages. In contrast to the cyclic data packets, these acyclic data packets are non-real-time-relevant, and for this reason the cyclic data packets are also referred to below as real-time-relevant data packets and the acyclic data packets as non-real-time-relevant data packets.

To control the data packet forwarding through the distribution node 10, the switching device 105 is connected to a switching table 106, also referred to below as a routing list. The routing list 106 has a data packet identifier, a transmission interface and a transmission time for each real-time-relevant data packet, and a transmission interface for each non-real-time-relevant data packet. In the case of the nonreal-time-relevant data packets, a plurality of different data packets may also have the same data packet identifier. In the case of the non-real-time-relevant data packets, the data packet identifier can be entirely dispensed with, since it is not absolutely necessary for the routing. In addition, however, the reception interface and the reception time, for example, can also be indicated in the routing list for both the real-time-relevant and non-real-time-relevant data packets.

On reception of a data packet via the receiving unit RX of an input/output interface 101, 102, 103, 104, the switching device 105 detects the data packet identifier. Real-time-relevant data packets recognized by the switching device 105 on the basis of the data packet identifier are then output at the predefined transmission time via the transmission interface noted in the routing list 106 for the data packet identifier.

If the data packet identifier identifies the received data packet as a non-real-time-relevant data packet, the switching device 105 furthermore determines the length of the non-real-time-relevant data packet in order to define the resulting transmission duration for the non-real-time-relevant data packet. If the non-real-time-relevant data packet is routed without a data packet identifier, the switching device 105 can also establish on the basis of other criteria, e.g. the absence of a data packet identifier, that the received data packet is a non-real-time-relevant data packet. The switching device 105 then further checks whether the transmission interface allocated to the non-real-time-relevant data packet in the routing list 106 is free for a transmission process, and whether the transmission pause duration of the transmission interface until the transmission time of the next real-time-relevant data packet specified in the routing list 106 corresponds at least to the determined transmission duration of the non-real-time-relevant data packet.

If a positive check result indicates that the intended transmission interface is not occupied for a duration sufficient for forwarding the non-real-time-relevant data packet, the switching device 105 then forwards the non-real-time-relevant data packet via the transmitting unit TX of the transmission interface. Conversely, in the case of a negative check result, i.e. if the transmission pause duration of the transmission interface intended for the transmission is shorter than the transmission duration of the non-real-time-relevant data packet, the non-real-time-relevant data packet is stored in a buffer memory 107 which, as shown in FIG. 2, is connected to the switching device 105.

The switching device 105 is furthermore essentially designed in such a way that a continuous check is carried out for each input/output interface 101, 102, 103, 104 to determine whether the input/output interface 101, 102, 103, 104 is currently transmitting. If a transmission-free status is determined, the transmission pause duration remaining until the next real-time-relevant data packet that is to be forwarded is further measured. The switching device 105 then further checks whether the buffer memory 107 contains non-real-time-relevant data packets which are intended to be forwarded on the corresponding input/output interface 101, 102, 103, 104 and of which the transmission duration corresponds at most to the determined transmission time pause duration. If a plurality of non-real-time-relevant data packets of this type are contained in the buffer memory 107, a procedure is followed such that the non-real-time-relevant data packet of which the transmission pause duration most closely approximates the transmission pause duration is selected for forwarding. Instead of a continuous check of the transmission-free state, the switching device 105 can also perform the check only if a non-real-time-relevant data packet is provided as a transmission interface for the respective input/output interface, i.e. has just been received by the switching device 105 or is present in the buffer memory 107.

Alternatively, the possibility also exists to take further criteria into account in the selection of the non-real-time-relevant data packet which is intended to be forwarded, such as, for example, the duration of the temporary storage of the non-real-time-relevant data packet. Thus, if a predefined storage time is exceeded in the case of a non-real-time-relevant data packet, it can be specified as a criterion that this non-real-time-relevant data packet is forwarded instead of the non-real-time-relevant data packet with a transmission duration which most closely approximates the transmission pause duration in input/output interfaces, in order to guarantee that all non-real-time-relevant data packets are transmitted in real time so that their information can then also be taken into account in real time in the control task.

The transmission times of the input/output interfaces 101, 102, 103, 104 of the distribution node 10 are optimally utilized with this procedure, wherein a secure and reliable data transmission is simultaneously ensured which, in particular, also takes account of the real-time requirements of an automation system.

In a further alternative procedure, the distribution node 10 in principle stores all non-real-time-relevant data packets which it receives on one of its input/output interfaces 101, 102, 103, 104 in the buffer memory 107, after establishing the required transmission duration. The switching device 105 in the distribution node is then designed in such a way that the switching device detects the transmission status for each input/output interface 101, 102, 103, 104. In the transmission-free state of the respective input/output interface 101, 102, 103, 104, the switching device 105 then further determines the transmission pause duration remaining until the forwarding of the next real-time-relevant data packet. The switching device 105 then checks whether non-real-time-relevant data packets with a transmission duration which corresponds at most to the transmission pause duration are present in the buffer memory 107 for this input/output interface 101, 102, 103, 104. If only one non-real-time-relevant data packet is determined, this is then forwarded. If a plurality of non-real-time-relevant data packets satisfy the transmission duration condition, a non-real-time-relevant data packet is selected according to one or more predefined criteria and is forwarded. A preferred selection criterion, as explained above, is preferably the difference between the respective transmission duration and the transmission pause duration. The non-real-time-relevant data packet which most closely approximates the measured transmission pause duration is then forwarded on the input/output interface 101, 102, 103, 104. A further criterion may, in particular, be the hold-up duration of the non-real-time-relevant data packet in the distribution node.

The data transmission explained above in a master-slave network with a distribution node 10 which interconnects the data traffic of a plurality of node strings can be performed in a single data transmission cycle in which both real-time-relevant data packets and non-real-time-relevant data packets are transmitted. The real-time-relevant data packets are forwarded via the allocated transmission interface at the predefined transmission time, as indicated in the routing list 106. The non-real-time-relevant data packets are then transmitted in transmission pauses between the non-real-time-relevant data packets in the data transfer cycle, i.e. in such a way that a non-real-time-relevant data packet which is optimum for the determined transmission pause duration is transmitted in the transmission time interval.

In the case of the non-real-time-relevant data packets, the switching device 105 in the distribution node 10, on receiving the non-real-time-relevant data packet, determines the transmission time duration of the data packet from length information contained in the data packet. In order to ensure a fast processing of the non-real-time-relevant data packet by the switching device, the length information is preferably contained in a first section of the data packet. The switching device 105 can then already evaluate the data field with the length information before the entire data packet has been received via an input/output interface of the distribution node 10, thereby speeding up the processing operation for determining the transmission duration of the data packet through the distribution node.

Figure 3A:
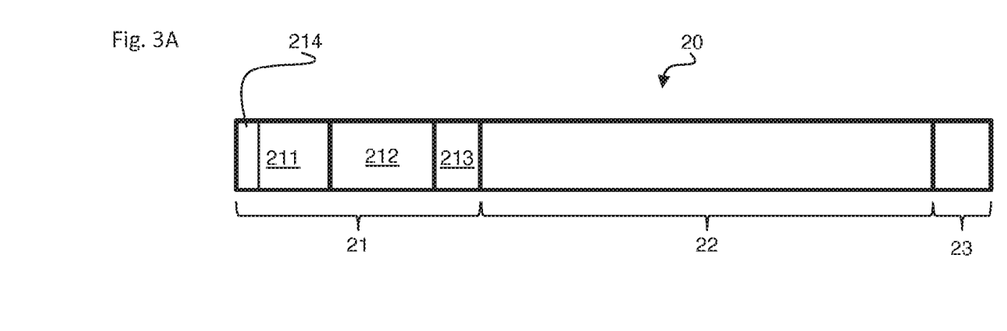
FIGS. 3A and 3B show two embodiments of a non-real-time-relevant data packet as an Ethernet message with a data field for length information.
Figure 3B:
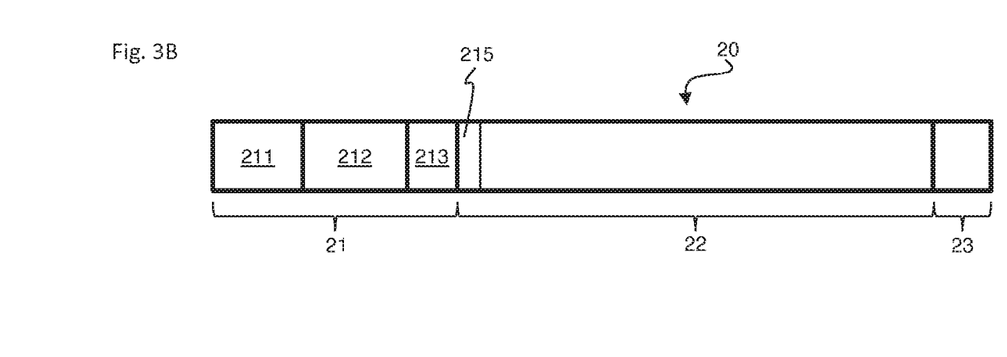

FIGS. 3A and 3B show two possible embodiments for transmitting the length information in an Ethernet message 20. The Ethernet message has a data area 22 with a length of up to 1,500 bytes which is encapsulated by a header section 21, referred to as the header, and an end section 23, referred to as the trailer. In the header, which is 14 bytes long, the destination address is indicated in a first 6-byte long data field 211, the source address is indicated in a following, similarly 6-byte long data field 212, and the Ethernet type is indicated in a 2-byte long final data field 213. The trailer 23 consists of a 4-byte long data field for transmitting a checksum in order to detect errors in the data transmission.

As shown in FIG. 3A, the possibility exists in the case of the Ethernet message 20 of already transmitting the length information also in the header 21, i.e. by storing the length information in the data field 211 with the destination address. A first section 214 having a size of 1 byte is preferably reserved in the destination address data field 211 for the length information. With this design of the Ethernet message, the length information is already transmitted at the earliest possible time in a non-real-time-relevant data packet, so that the delay in the processing of a non-real-time-relevant data packet in the distribution node 10 resulting from the evaluation of the length information is reduced to a minimum.

Alternatively, as shown in FIG. 3B, a data field 215 with the length information is also provided in the data area 22 of the Ethernet message.

This design is suitable particularly if data packets which have been created with a different protocol are intended to be tunneled with the Ethernet protocol, as in the case of the automation network shown in FIG. 1, in which the node strings 12, 13, 14 are connected in each case via the coupler 121, 131, 141 to the master node 11. The master node 11 operates with the Ethernet protocol. The couplers 121, 131, 141 and the following slave node use a fieldbus protocol, in the present case the EtherCAT protocol, as application software. The data field 215 with the length information is then preferably provided in a data field in the header of the data area in the Ethernet message, as shown in FIG. 3B. With this procedure, the possibility exists of transmitting the non-real-time-relevant data packets created with a fieldbus protocol as Ethernet messages without a modified header, wherein a fast evaluation of the length information following the reception of the Ethernet message is possible due to the transmission of the length information in the header area of the data area.

Figure 4A:
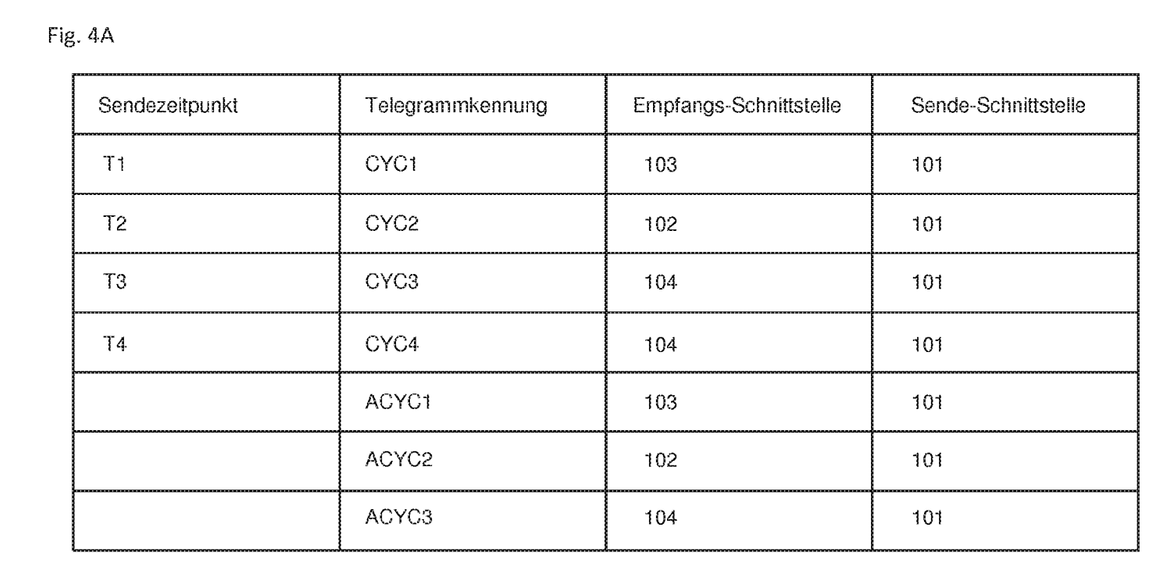
FIG. 4A shows a routing list for four real-time-relevant data packets and three non-real-time-relevant data packets.
Figure 4B:
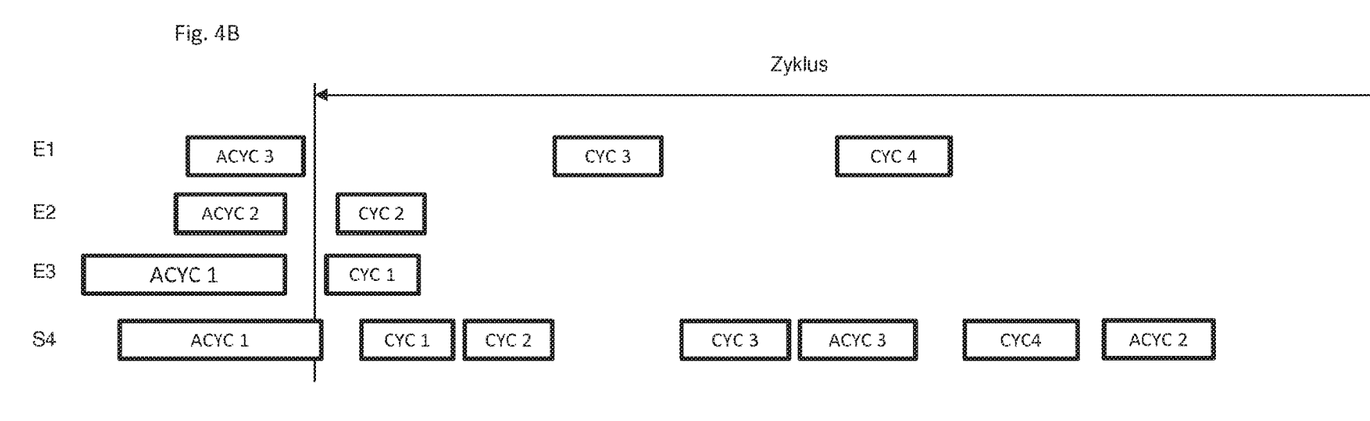
FIG. 4B shows a first possible procedure for the data packet forwarding and FIG. 4C shows a second procedure for the data packet forwarding.
Figure 4C:
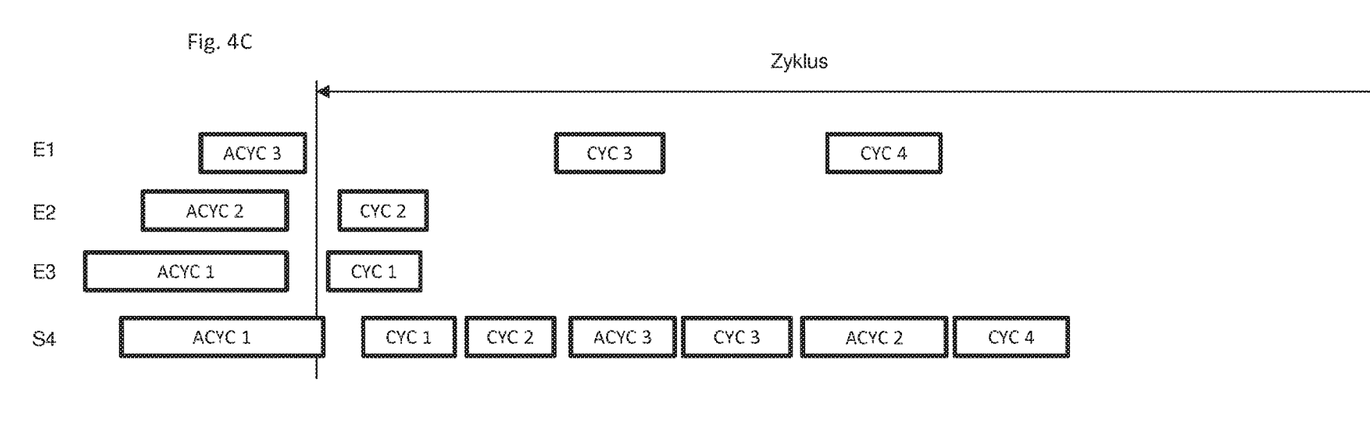

FIGS. 4A, 4B and 4C show by way of example two possible procedures for the transmission of cyclic, i.e. real-time-relevant, Ethernet messages and acyclic, i.e. non-real-time-relevant, Ethernet messages in the automation network shown in FIG. 1. Four cyclic Ethernet messages CYC1, CYC2, CYC3, CYC4 and three acyclic Ethernet messages ACYC1, ACYC2, ACYC3 are intended to be channeled through the distribution node 10. FIG. 4A shows a possible design of the routing list 106 in the distribution node 10. The routing list 106 is designed in the form of a table with columns for the transmission time, message identifier, reception interface and transmission interface. Transmission times are indicated for the cyclic Ethernet messages CYC1, CYC2, CYC3, CYC4 only.

The Ethernet messages are furthermore received according to the routing list 106 on the three input/output interfaces 102, 103, 104 which are connected in each case to one of the three slave node strings 12, 13, 14. The Ethernet messages are then transmitted on the input/output interface 101 which is connected to the master node 11.

FIG. 4B shows on a time axis the variation with time of the reception and transmission process, wherein the length of the data transmission cycle is plotted. The acyclic Ethernet message ACYC1 is received by the distribution node 10 as the first Ethernet message on the input/output interface 103 as the reception interface. The switching device 105 in the distribution node 10 then determines the transmission duration from the length information of the acyclic Ethernet message ACYC1. As shown in FIG. 4B, this transmission duration is shorter than the transmission pause duration of the input/output interface 101 provided as the transmission interface until the transmission time of the first cyclic telegram CYC1 in the data transfer cycle. The acyclic Ethernet message ACYC1 is therefore output immediately by the distribution node on the input/output interface 101.

The acyclic Ethernet messages ACYC2 and ACYC3 then arrive on the input/output interfaces 102 and 103 as reception interfaces temporally after the acyclic Ethernet message ACYC1. However, since their transmission time duration determined by the switching device 105 in the distribution node 10 is greater than the transmission pause duration of the input/output interface 101 provided as the transmission interface remaining after the transmission of the acyclic Ethernet message ACYC1 until the transmission time of the first cyclic message CYC1 in the data transfer cycle, the acyclic Ethernet messages ACYC2 and ACYC3 are stored in the buffer memory 107.

As further shown in FIG. 4B, the cyclic Ethernet messages CYC1 and CYC2 received on the input/output interfaces 102 and 103 as reception interfaces after the acyclic Ethernet messages are then forwarded by the distribution node 10 on the input/output interface 101 provided as the transmission interface after the acyclic Ethernet message ACYC1 at the transmission times recorded in the routing list 106. No transmission pause time occurs between the cyclic Ethernet messages CYC1 and CYC2.

A further transmission pause time then occurs on the input/output interface 101 provided as the transmission interface between the cyclic Ethernet messages CYC2 and CYC3. Since this transmission pause duration is shorter than the transmission time of the first temporarily stored acyclic Ethernet message ACYC2, this transmission pause time remains free and the acyclic Ethernet message ACYC2 is then transmitted only in the next transmission pause duration which is greater than the transmission duration of the acyclic Ethernet message ACYC2 and is located between the cyclic Ethernet messages CYC3 and CYC4. The last remaining acyclic Ethernet message ACYC3 is then transmitted until the cycle end. In this design of the distribution node, the acyclic Ethernet messages are always forwarded in the sequence in which they are received by the distribution node, i.e. whenever a corresponding transmission pause duration of the input/output interface provided as the transmission interface occurs.

Alternatively, as shown in the embodiment in FIG. 4C, an optimization of the transmission of the acyclic Ethernet messages in relation to the occurring transmission pause duration can be performed by the switching device 105 of the distribution node 10. In the procedure shown in FIG. 4C, in contrast to the procedure shown in FIG. 4B, the acyclic Ethernet message ACYC3, which was received after the acyclic Ethernet message ACYC2 and is therefore stored in the buffer memory 107 in the sequence after this acyclic Ethernet message, is transmitted between the cyclic Ethernet messages CYC2 and CYC3. The transmission duration of this acyclic Ethernet message ACYC3 which was received later is shorter than the transmission pause duration between the cyclic Ethernet messages CYC2 and CYC3. The transmission of the acyclic Ethernet message ACYC3 can therefore be carried out before the acyclic Ethernet message ACYC2 which was received later, the transmission duration of which is longer than the transmission pause duration between the cyclic Ethernet messages CYC2 and CYC3.

If the distribution node is not used as a switch for incorporating a plurality of nodes or node strings in parallel into the network, but instead as a synchronization gateway for a master node, and then has only two input/output interfaces to connect the master node to the network, the forwarding of the data packets from one input/output interface to the other input/output interface is permanently predefined in the distribution node. The routing list in the distribution node then only has to contain a transmission time for each real-time-relevant data packet. If a non-real-time-relevant data packet is present in the switching device, the switching device then determines whether the input/output interface provided for forwarding is in the transmission-free state and furthermore determines the transmission pause duration remaining until the forwarding of the next real-time-relevant data packet. If a non-real-time-relevant data packet with a transmission duration corresponding at most to the transmission pause duration is then present for the input/output interface, the switching device forwards the corresponding non-real-time-relevant data packet via the input/output interface.

The data transmission is preferably implemented by the master node 11 in the distribution node 10 during the configuration phase of the automation network. The routing list 106 is predefined by the master node 11 for the distribution node 10. Since cyclic Ethernet messages are allowed to be transmitted in the automation network designed as a master-slave system by both the master node and the slave nodes, but acyclic Ethernet messages by the master node only, an overload situation in relation to the acyclic Ethernet messages can essentially be avoided through a corresponding design of the routing list 106 in the distribution node 10 in the configuration phase. The master node 11 in fact knows the network capacity for acyclic Ethernet messages remaining according to the routing list 106 and can control the transmission of the acyclic Ethernet messages accordingly.

According to an embodiment, a distribution node in an automation network has at least two input/output interfaces for transmitting and receiving real-time-relevant and non-real-time-relevant data packets, and a switching device which is connected to the two input/output interfaces. The switching device forwards data packets received via an input/output interface via a further input/output interface using a switching table, wherein the switching table contains at least a transmission time for each real-time-relevant data packet. Furthermore, in the event that a non-real-time-relevant data packet is received, the switching device detects the length of the non-real-time-relevant data packet in order to ascertain the transmission duration resulting therefrom for the non-real-time-relevant data packet. Furthermore, at least if an input/output interface is provided as a transmission interface for a non-real-time-relevant data packet and is in the transmission-free state, the switching device detects the transmission pause duration remaining until the forwarding of the next real-time-relevant data packet for the respective input/output interface and checks whether a non-real-time-relevant data packet is present with a transmission duration which corresponds at most to the transmission pause duration for this input/output interface as the transmission interface in order to forward the non-real-time-relevant data packet via the input/output interface in the event of a positive check result.

With this procedure, an optimum use of the possible transmission time of the input/output interfaces of the distribution node is enabled, wherein the hold-up duration in the transmission is reduced to a minimum. In particular, the risk of an overflow of the non-real-time-relevant data packets arriving acyclically in the distribution node can thus also be prevented through the optimum data transmission.

According to a further embodiment, the distribution node of the automation network is operated with a single data transfer cycle. It is thus no longer necessary to subdivide the data transfer cycle into time sections and make sure that no non-real-time-relevant data packets are forwarded in specific time sections of the data transfer cycle. The non-real-time-relevant data packets can then be forwarded, distributed over the entire cycle time, i.e. whenever a transmission pause duration of the allocated transmission interface corresponds at least to the transmission duration of a non-real-time-relevant data packet.

According to a further embodiment of the invention, a non-real-time-relevant data packet is temporarily stored if the allocated transmission interface is not released for forwarding the non-real-time-relevant data packet. This can be done by checking, on reception of the non-real-time-relevant data packet, whether the allocated transmission interface is free until the transmission of the next real-time-relevant data packet for the transmission duration resulting from the length of the real-time-relevant data packet. In the event of a positive check result, the non-real-time-relevant data packet is forwarded via the allocated transmission interface. Conversely, in the event of a negative check result, the non-real-time-relevant data packet is temporarily stored. An effective and resource-saving processing of non-real-time-relevant data packets in the distribution nodes is implemented with this procedure. Non-real-time-relevant data packets arriving in the distribution node are forwarded as quickly as possible without delay if transmission time is free.

According to a further embodiment, the transmission pause duration of an input/output interface free for transmission is compared with the transmission duration of the non-real-time-relevant data packets allocated to the input/output interface as the transmission interface and present in the distribution node in order to select, from the non-real-time-relevant data packets of which the transmission duration corresponds at most to the transmission duration, a non-real-time-relevant data packet to be forwarded according to a predefined criterion. With this procedure, a data packet that is optimum for the transmission procedure can be selected from the non-real-time-relevant data packets present in the distribution node for an input/output interface free for transmission. In particular, the non-real-time-relevant data packet of which the transmission duration most closely approximates the transmission pause time of the transmission interface is then selected. The transmission time of the input/output interfaces in the switching node is optimally utilized with this procedure, thereby further reducing the risk of overload situations in relation to non-real-time-relevant data packets. Alternatively or in addition to the transmission duration, the possibility also exists of providing further criteria in the selection of a non-real-time-relevant data packet for forwarding on a free transmission interface, in particular the retention time in the distribution node.

According to a preferred embodiment, the data packets are Ethernet messages, wherein, in the case of non-real-time-capable Ethernet messages, a data field for the length information is provided in a header section of the data area. With this procedure, no modification of the Ethernet messages that can be processed in the distribution node is required in a transmission layer of the automation network compared with conventional Ethernet messages. The length information of the non-real-time-relevant Ethernet messages is contained in the data area which is created in a higher-order line layer of the automation network. The length information is preferably stored in the header section of the data area, so that a decision can be made by the switching node on reception of the non-real-time-relevant Ethernet message, even before the reception of the entire Ethernet message, as to whether the message can be forwarded on the transmission interface intended for it on the basis of the transmission duration of the Ethernet message.

Alternatively, in the case of a non-real-time-capable Ethernet message, a data field in the destination address section of the message header may already contain the length information. Through the inclusion of the length information in the foremost telegram area, the distribution node can already decide at the earliest possible time whether the Ethernet message can be forwarded by the distribution node.

As described herein, a distribution node for an automation network comprises at least two input/output interfaces for transmitting and receiving real-time-relevant and non-real-time-relevant data packets, and a switching device connected to the input/output interfaces. The switching device forwards data packets received via an input/output interface via a further input/output interface using a switching table, wherein the switching table contains at least a data packet identifier and a transmission time in a data transfer cycle for each real-time-relevant data packet. The switching device detects a data packet identifier on reception of a real-time-relevant data packet. The switching device outputs the real-time-relevant data packet at the transmission time allocated to the detected data packet identifier in the switching table via an input/output interface as a transmission interface. The switching device, on reception of a non-real-time-relevant data packet, detects the length of the non-real-time-relevant data packet in order to determine the transmission duration resulting therefrom for the non-real-time-relevant data packet. The switching device, at least if an input/output interface is provided as a transmission interface for a non-real-time-relevant data packet and is in the transmission-free state, detects the transmission pause duration remaining until the forwarding of the next real-time-relevant data packet for the respective input/output interface and to check whether a non-real-time-relevant data packet is present with a transmission duration which corresponds at most to the transmission pause duration for the input/output interface as the transmission interface in order to forward the non-real-time-relevant data packet via the input/output interface in the event of a positive check result.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A distribution node for an automation network comprising:
    at least two input/output interfaces adapted for transmitting and receiving a plurality of real-time-relevant and non-real-time-relevant data packets within a data transfer cycle, and
    a switching device connected to the input/output interfaces, wherein the switching device forwards data packets received via a first input/output interface via a second input/output interface using a switching table listing the plurality of real-time-relevant data packets within the data transfer cycle, each listing entry containing a discrete data packet identifier and a discrete transmission time within the data transfer cycle for the corresponding real-time-relevant data packet,
    wherein the switching device detects a data packet identifier on reception of one of the real-time-relevant data packets and outputs said real-time-relevant data packet at the transmission time allocated to the detected data packet identifier in the switching table via the second input/output interface as a transmission interface,
    wherein the switching device, on reception of one of the non-real-time-relevant data packets, detects a length of said non-real-time-relevant data packet in order to determine a transmission duration resulting therefrom for the non-real-time-relevant data packet, and
    wherein the switching device continuously checks whether the second input/output interface is in a transmission-free state, and if the second input/output interface is in the transmission-free state, utilizes the switching table to determine a transmission pause duration, the transmission pause duration being a time period remaining within the data transfer cycle until the discrete transmission time of a next real-time-relevant data packet listed in the switching table, and checks whether one of the non-real-time-relevant data packets is present with a transmission duration which corresponds at most to the transmission pause duration for the second input/output interface within the data transfer cycle as the transmission interface in order to forward the non-real-time-relevant data packet via the second input/output interface in the event of a positive check result so that a mixed sequence of real-time relevant data packets and of non-real-time relevant data packets within the data transfer cycle can be forwarded, wherein said non-real-time-relevant data packet can be present between two of the real-time-relevant data packets within the same data transfer cycle.

2. The distribution node as claimed in claim 1, wherein the switching device temporarily stores the non-real-time relevant data packet if the allocated transmission interface of the non-real-time relevant data packet is not released for forwarding.

3. The distribution node as claimed in claim 2, wherein the switching device checks, on reception of the non-real-time-relevant data packet, whether the allocated transmission interface is free until the transmission of the next real-time-relevant data packet for the transmission duration resulting from the length of the real-time-relevant data packet, wherein, in the event of a positive check result, the non-real-time-relevant data packet is forwarded via the allocated transmission interface, and, in the event of a negative check result, the non-real-time-relevant data packet is temporarily stored.

4. The distribution node as claimed in claim 2, wherein the switching device compares the transmission pause duration of the second input/output interface free for transmission with the transmission duration of non-real-time-relevant data packets allocated to the input/output interface as the transmission interface and present in the distribution node and selects, from the non-real-time-relevant data packets of which the transmission duration corresponds at most to the transmission pause duration, the non-real-time-relevant data packet to be forwarded according to a predefined criterion.

5. The distribution node as claimed in claim 4, wherein a selection criterion is the transmission duration and/or a hold-up duration in the distribution node.

6. An automation network comprising:
   a distribution node and at least one node, the distribution node comprising at least two input/output interfaces adapted for transmitting and receiving a plurality of real-time-relevant and non-real-time-relevant data packets within a data transfer cycle, and
   a switching device connected to the input/output interfaces, wherein the switching device forwards data packets received via a first input/output interface via a second input/output interface using a switching table listing the plurality of real-time-relevant data packets within the data transfer cycle, each listing entry containing a discrete data packet identifier and a discrete transmission time in the data transfer cycle for the corresponding real-time-relevant data packet,
   wherein the switching device detects a data packet identifier on reception of one of the real-time-relevant data packets and outputs said real-time-relevant data packet at the transmission time allocated to the detected data packet identifier in the switching table via the second input/output interface as a transmission interface,
   wherein the switching device, on reception of one of the non-real-time-relevant data packets, detects a length of said non-real-time-relevant data packet in order to determine a transmission duration resulting therefrom for the non-real-time-relevant data packet,
   wherein the switching device continuously checks whether the second input/output interface is in a transmission-free state, and if the second input/output interface is in the transmission-free state, utilizes the switching table to determine a transmission pause duration, the transmission pause duration being a time period remaining within the data transfer cycle until the discrete transmission time of a next real-time-relevant data packet listed in the switching table and to check whether one of the non-real-time-relevant data packet is present with a transmission duration which corresponds at most to the transmission pause duration for the second input/output interface as the transmission interface in order to forward the non-real-time-relevant data packet via the second input/output interface in the event of a positive check result, and
   wherein each input/output interface is connected to the at least one node and the data transfer of the real-time-relevant and the non-real-time-relevant data packets takes place within the data transfer cycle in a mixed sequence, wherein the non-real-time-relevant data packet can be present between two real-time-relevant data packets within the same data transfer cycle.

7. The automation network as claimed in claim 6, wherein the switching device of the distribution node temporarily stores the non-real-time relevant data packet if the allocated transmission interface of the non-real-time relevant data packet is not released for forwarding.

8. The automation network as claimed in claim 7, wherein the switching device of the distribution node checks, on reception of the non-real-time-relevant data packet, whether the allocated transmission interface is free until the transmission of the next real-time-relevant data packet for the transmission duration resulting from the length of the real-time-relevant data packet,
   wherein, in the event of a positive check result, the non-real-time-relevant data packet is forwarded via the allocated transmission interface, and, in the event of a negative check result, the non-real-time-relevant data packet is temporarily stored.

9. The automation network as claimed in claim 7, wherein the switching device of the distribution node compares the transmission pause duration of the input/output interface free for transmission with the transmission duration of non-real-time-relevant data packets allocated to the second input/output interface as the transmission interface and present in the distribution node and selects, from the non-real-time-relevant data packets of which the transmission duration corresponds at most to the transmission pause duration, a non-real-time-relevant data packet to be forwarded according to a predefined criterion.

10. The of the distribution node as claimed in claim 9, wherein a selection criterion is the transmission duration and/or a hold-up duration in the distribution node.

11. A method for transmitting a plurality of real-time-relevant and non-real-time-relevant data packets within a data transfer cycle in an automation network with a plurality of nodes and a distribution node which has at least two input/output interfaces and a switching device connected to the two input/output interfaces, wherein:
   each input/output interface of the distribution node is connected to at least one node, and the distribution node forwards data packets received via a first input/output interface via a second input/output interface using a switching table listing the plurality of real-time-relevant data packets within the data transfer cycle, each listing entry containing a discrete data packet identifier and a discrete transmission time in the data transfer cycle for the corresponding real-time-relevant data packets,
   the switching device detects a data packet identifier on reception of one of the real-time-relevant data packets,
   the switching device outputs said real-time-relevant data packet at the transmission time allocated to the detected data packet identifier in the switching table via the second input/output interface as a transmission interface,
   the switching device, on reception of one of the non-real-time-relevant data packets detects a length of said non-real-time-relevant data packet in order to determine a transmission duration resulting therefrom for the non-real-time-relevant data packet, and
   the switching device continuously checks whether the second input/output interface is in a transmission-free state, and if the second input/output interface is in the transmission-free state, detects a transmission pause duration, the transmission pause duration being a time period remaining within the data transfer cycle until the discrete transmission time of a next real-time-relevant data packet listed in the switching table and checks whether one of the non-real-time-relevant data packets is present with a transmission duration which corresponds at most to the transmission pause duration for the second input/output interface as the transmission interface in order to forward the non-real-time-relevant data packet via the input/output interface in the event of a positive check result so that a mixed sequence of real-time relevant data packets and of non-real-time-relevant data packets within the data transfer cycle can be forwarded, wherein the non-real-time-relevant data packet can be present between two real-time-relevant packets within the same data transfer cycle.

12. The method as claimed in claim 11, wherein the switching device of the distribution node temporarily stores the non-real-time relevant data packet if the allocated transmission interface is not released for forwarding the non-real-time relevant data packet.

13. The method as claimed in claim 12, wherein the switching device of the distribution node, on reception of the non-real-time-relevant data packet, checks whether the allocated transmission interface is free until the transmission of the next real-time-relevant data packet for the transmission duration resulting from the length of the real-time-relevant data packet, wherein, in the event of a positive check result, the non-real-time-relevant data packet is forwarded via the allocated transmission interface, and, in the event of a negative check result, the non-real-time-relevant data packet is temporarily stored.

14. The method as claimed in claim 12, wherein the switching device of the distribution node compares the transmission pause duration of the second input/output interface free for transmission with the transmission duration of non-real-time-relevant data packets allocated to the input/output interface as the transmission interface in order to select, from the non-real-time-relevant data packets of which the transmission pause duration corresponds at most to the transmission duration, a non-real-time-relevant data packet to be forwarded according to at least one predefined criterion.

15. The method as claimed in claim 14, wherein a selection criterion is the transmission duration and/or a hold-up duration in the distribution node.

16. The method as claimed in claim 11, wherein the data transfer of the real-time-relevant and the non-real-time-relevant data packets takes place in the individual data transfer cycle.

17. The method as claimed in claim 11, wherein the data packets are Ethernet messages and wherein, in the case of non-real-time-relevant Ethernet messages, the data field for the length information is provided in a header section of the data area.

18. The method as claimed in claim 11, wherein the data packets are Ethernet messages and wherein, in the case of non-real-time-relevant Ethernet messages the data field for the length information is provided in a destination address section in a header area.

* * * * *